US009448975B2

(12) United States Patent
Takatsuka et al.

(10) Patent No.: US 9,448,975 B2
(45) Date of Patent: Sep. 20, 2016

(54) CHARACTER DATA PROCESSING METHOD, INFORMATION PROCESSING METHOD, AND INFORMATION PROCESSING APPARATUS

(71) Applicant: FUJITSU LIMITED, Kawasaki-shi, Kanagawa (JP)

(72) Inventors: Masaki Takatsuka, Mishima (JP); Masahiro Takeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/467,401

(22) Filed: Aug. 25, 2014

(65) Prior Publication Data

US 2015/0055868 A1    Feb. 26, 2015

(30) Foreign Application Priority Data

Aug. 26, 2013   (JP) ................. 2013-174800

(51) Int. Cl.
*G06K 9/18*     (2006.01)
*G06F 17/22*    (2006.01)

(52) U.S. Cl.
CPC .................. *G06F 17/2223* (2013.01)

(58) Field of Classification Search
USPC ................ 382/185, 181, 203; 705/51, 57; 715/234, 255
See application file for complete search history.

(56) References Cited

U.S. PATENT DOCUMENTS 8,302,001 B2 * 10/2012 Mitsui ................. G06F 17/211
                                                  705/51
2004/0268256 A1   12/2004 Furuta et al.

FOREIGN PATENT DOCUMENTS

| JP | 07-192013 | 7/1995 |
| JP | 2004-252944 | 9/2004 |
| JP | 2010-009532 | 1/2010 |

OTHER PUBLICATIONS

UNICODE, Translation of http://ja.wikipedia.org/wiki/Unicode as of Feb. 23, 2013, pp. 1-19 (43 pages, including partial English translation).

* cited by examiner

*Primary Examiner* — Anh Do
(74) *Attorney, Agent, or Firm* — Fujitsu Patent Center

(57) ABSTRACT

A character data processing method executed by a computer includes detecting glyph variant information from an input character data string, and converting detected glyph variant information to extended expression data, the extended data and the detected glyph variant information, the basic character data being associated with the detected glyph variant information in the input character string, wherein the extended expression data can be converted to the basic character data by specific bit arithmetic processing.

7 Claims, 10 Drawing Sheets

CHARACTER DATA PROCESSING METHOD, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2013-174800, filed on Aug. 26, 2013, the entire contents of which are incorporated herein by reference.

FIELD

Disclosure relates to a character data processing method, an information processing method, and an information processing apparatus.

BACKGROUND

Conventionally, in regard to consideration of character codes, a correspondence between an area length (for example, the number of bytes) of character data and a size of field in a display screen, a form, or the like is determined at a pattern. For example, alphabets, numbers, and katakana without voiced sound symbol are expressed by an area length of one half-sized byte. Japanese characters are expressed by an area length of two full-sized bytes. Katakana with voiced sound symbol is indicated by an area length of two half-sized bytes (one byte+one byte=two bytes). These area lengths coincide with the size of field in the display screen, the form, or the like. In this way, in a business application that treats characters, the size of field in the form and the size of character data treated in the application are declared to adjust the size of the area of the field and a display size of the character data. Therefore, a developer or the like of the business application that treats characters develops the business software without regard to the adjustment between the display size of the character data and the size of the field where the character data is outputted.

Meanwhile, Unicode (UTF16) has appeared as a character code that can treat all characters defined in JIS 2004, and an environment of handling one Japanese character in area lengths of two bytes and four bytes is started to be widely used. In the environment using UTF16, the developer or the like of the business application that treats the characters also can use UTF32 for encoding of input character data to design character data treated in area lengths of two bytes and four bytes in a fixed length of four bytes per character.

For more information, see "Unicode," [searched on Feb. 5, 2013], Internet, <URL:https://ja.wikipedia.org/wiki/Unicode>

SUMMARY

In recent years, a technique called a "variation selector" that provide identification information, such as VS1, VS2, . . . , to Unicode of a character becoming a base to allow uniformly treating variant(s) (i-tai-ji) of a target character is started to be widely used (for example, Windows 8 (registered trademark) supports variants). The use of the variation selector can identify and express variants, such as, for example, Chinese characters of 高 and 髙 that exist in Japanese characters.

As the identification information attached to the character data becoming the base for identifying a variant, a UTF16 code having four bytes is allocated to the character. Therefore, the area length of character data with the variation selector is expressed by a variable length of six to eight bytes in UTF16. Hereinafter, the character data becoming a base in the variation selector is called "a basic character data."

For example, the developer of the system treating the variation selectors treats one character data of Japanese character as a variable area length of the UTF16 (no glyph variant information: two to four bytes, with glyph variant information: six to eight bytes) to design the business application. However, in the conventional design environment, the correspondence between the number of characters and the data length is fixed. Hence, the number of characters of a name column or the like of a screen or a form is fixed in most cases, and the size of the corresponding data is also the size corresponding to the number of characters. The developer of the system for handling the variation selectors treats character codes, each of which has a variable length, to manage both of the number of characters and the area length. Therefore, management burden to the developer increases. For example, every time the developer takes out characters from a database, the developer counts the number of characters to perform an error check of whether the target characters fit in the field of the screen or the form that outputs the target characters, and the load of operation increases.

One of aspects of embodiments is a character data processing method executed by a computer. The method includes:

detecting glyph variant information from an input character data string; and converting detected glyph variant information to extended expression data, the extended data and the detected glyph variant information, the basic character data being associated with the detected glyph variant information in the input character string, wherein the extended expression data can be converted to the basic character data by specific bit arithmetic processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram indicating an example of variants of "芦 (ashi)";

FIG. 2B is a diagram indicating an example of a sentence using a plurality of variants of "芦 (ashi)";

DESCRIPTION OF EMBODIMENTS

Hereinafter, a conversion apparatus according to an embodiment will be described with reference to the drawings. The following configuration of the embodiment is illustrative, and the conversion apparatus is not limited to the configuration of the embodiment.

Hereinafter, the conversion apparatus will be described based on FIGS. 1 to 9.

First Embodiment

Figure 1:
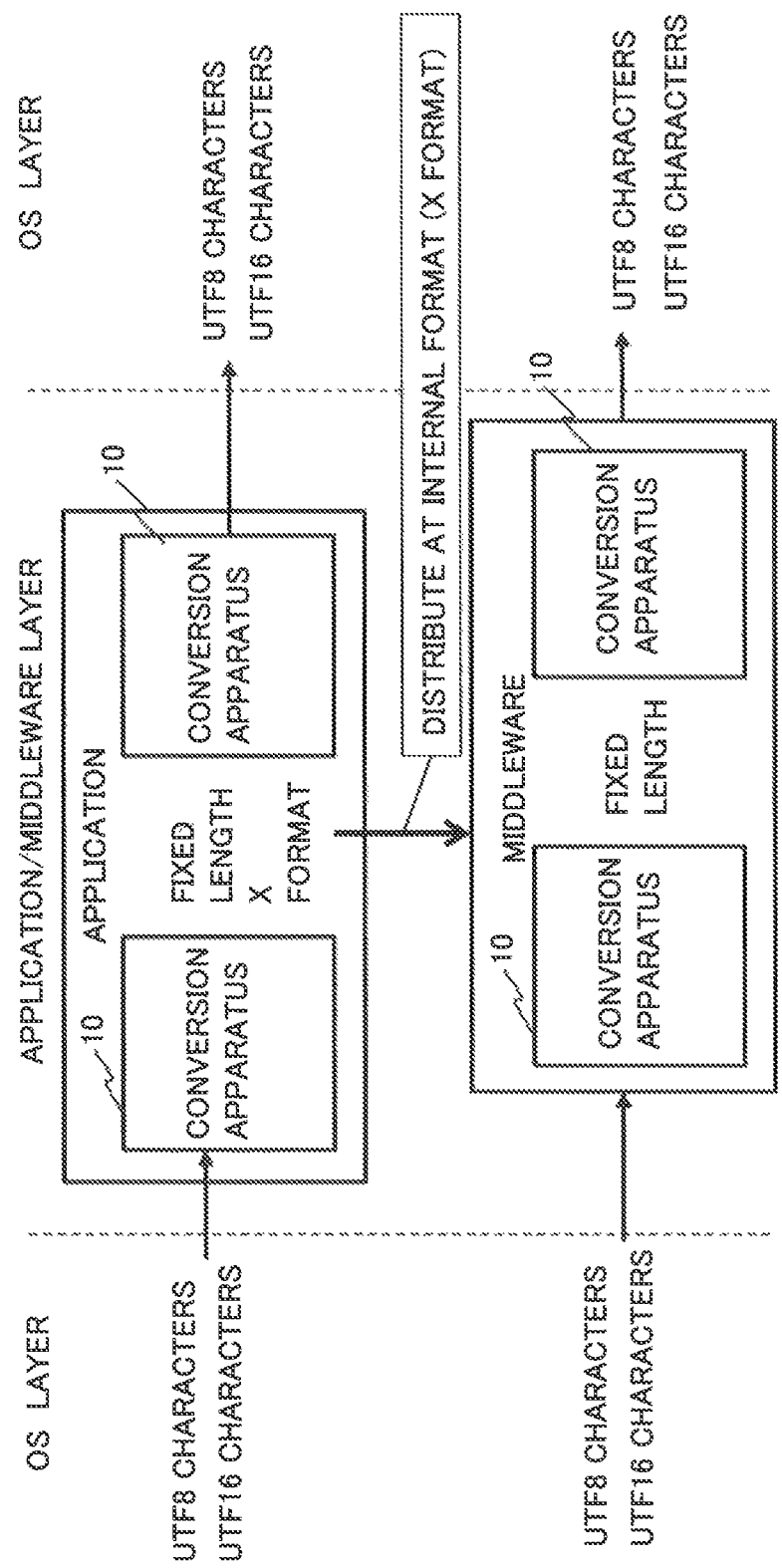
FIG. 1 is a diagram explaining a conversion apparatus of the present embodiment.

FIG. 1 illustrates an explanatory view of the conversion apparatus of the present embodiment. The conversion apparatus of the present embodiment is implemented by, for example, an information processing apparatus, such as a server and a computer, for developing a business application treating characters (character data). The conversion apparatus of the present embodiment can treat a variable-length Unicode character with a variation selector as a fixed-length area length in an application and middleware executed by the information processing apparatus.

First, variants and a variation selector of the background will be described.

Figures 2A, 2B:
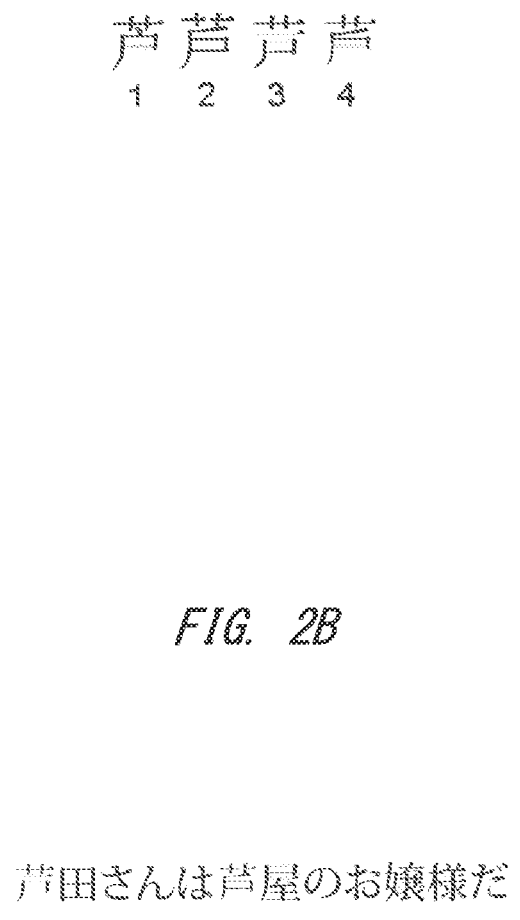

Variants which a variation selector is attached will be described with reference to FIGS. 2A and 2B. FIG. 2A is an example of variants of "芦 (ashi)" in a simplified form. A variant is a character having a character form differing from a character having a standard character form (for example, a simplified form). In other words, a variant is a character having two or more expressions (character forms), each of which has the same word origin. As illustrated in FIG. 2A, a character of "芦 (ashi)" expressed by the simplified form (see No. 3) includes three variants (see No. 1, 2 and 4). A character code (Unicode) of "芦 (ashi)" expressed by the simplified form is indicated by "0x82a6". Here, "0x####" indicates a hexadecimal notation, and "#" indicates hexadecimal "0" to "F".

When the variation selector is used, the four variants (the character expressed by the simplified form is treated as one of variants) illustrated in FIG. 2A are treated as "character data/character data set" obtained by adding four-byte identification information (identifier) to a basic character data (namely, a character data becoming a base of variants) in order to express each of the variants.

When the variation selectors are used, one of characters forming the variants is defined as a basic character. In the example of FIG. 2A, the basic character is the character "芦 (ashi)" expressed by the simplified form (No. 3). In this case, the character code of the basic character is "0x82a6".

Hence, the variants of "ashi" can be expressed by the following "character data/character data set".

(1) A character form of No. 1 in FIG. 2A: 芦 +VS17 (0x82a6 0x000e0111)

(2) A character form of No. 2 in FIG. 2A: 芦 +VS18 (0x82a6 0x000e0112)

(3) A character form of No. 3 in FIG. 2A: 芦 +VS19 (0x82a6 0x000e0113)

(4) A character form of No. 4 in FIG. 2A: 芦 +VS20 (0x82a6 0x000e0114)

Where each of "VS17", "VS18", "VS19", and "VS20" added to the basic character code indicates an identifier used at the variation selector. The identifier is one of examples of "identification information". Thus, when the variation selector is used, each variant is expressed by "a character code of the basic character"+"an identifier".

"0x000e0111" of (1) indicates, for example, a hexadecimal code corresponding to the identifier "VS17". Similarly, "0x000e0112" of (2) indicates a hexadecimal code of the identifier "VS18", "0x000e0113" of (3) indicates a hexadecimal code of the identifier "VS19", and "0x000e0114" of (4) indicates a hexadecimal code of the identifier "VS20". When the variation selector is used, each variant can be treated as the "character data/character data set" including the basic character data and the identifier. Therefore, the character data can be uniformly and systematically treated compared to the conventional system for separately allocating different character codes to the variants.

The developer or the like of the application that treats characters can use the variation selectors and the character codes illustrated in FIG. 2A to express a sentence with a combination of a plurality of variants as illustrated for example in FIG. 2B. A range of "VS17" to "VS256" is allocated to the variation selectors. The identifiers of "VS17" to "VS20" is prepared for the variants of "芦 (ashi)" illustrated in FIG. 2A. However, identifiers for expressing variants are not prepared with respect to characters which have no variants (e.g., a character of "蒦 (ai)") have no variants. Hence, this example character "(ai)" is expressed by a character code "0x88a4" in the expression of the "character data/character data set" using the variation selector. Therefore, the area length of the character which has no variants is a 2-byte area length expressed by UTF16.

On the other hand, in the case of "芦 (ashi)" illustrated in FIG. 2A, each of the variants is expressed by "character code of basic character"+"variation selector". Therefore, the area length of the character data of "芦 (ashi)" with a variant is six bytes in total which is a sum of a two-byte "character code" and a four-byte "variation selector". Further, characters defined in JIS 2004 include characters of a new character form expressed by a four-byte character code (it is called "four-byte characters," for example, a character of "谷"). When a four-byte character has the variant(s), the character data of the four-byte character has an eight-byte area length (four-byte basic character code+identifier (variant selector)).

The developer or the like of the business application that treats the variation selector sets the character code of each character to a variable length to manage both of the number of characters and the area length. Therefore, the management burden in the development and design increases.

Returning to the explanatory view illustrated in FIG. 1, a program for which an information processing apparatus(es) (a computer(s)) operates the conversion apparatus 10 of the present embodiment is incorporated into a business application or middleware that treats existing characters. In the explanatory view illustrated in FIG. 1, the variable-length Unicode characters (UTF8, UTF16) with the variation selector are input through, for example, an input device or the like included in an information processing apparatus that operates as the conversion apparatus 10. The variable-length character data including the variation selectors is delivered to the business application that treats the existing characters through, for example, an Operating System (OS) included in the information processing apparatus. The conversion apparatus 10 converts the delivered variable-length character data to fixed-length data having a predetermined length or to an internal format (X format) in a program. According to the conversion apparatus 10 of the present embodiment can treat the character data converted to the fixed-length data of a predetermined length as a processing format similar to the conventional format.

Further, the fixed-length character data obtained by the conversion apparatus 10 of the present embodiment is converted again to variable-length character data through the conversion apparatus 10. The variable-length character data converted by the program of the conversion apparatus 10 includes the variation selector, and the variable-length character data is given to the OS to display or output a character based on the variable-length character data on a display device or the like included in the information processing apparatus.

In the business application, the fixed-length character data converted to a processing format (internal format) in the program by the conversion apparatus 10 of the present embodiment is delivered to middleware or the like in the fixed-length state. The variable-length character data delivered to the middleware through the OS is delivered to the program of the conversion apparatus 10 incorporated into the middleware.

The program of conversion apparatus 10 incorporated into the middleware converts the delivered variable-length character data to fixed-length character data of a predetermined length. To the fixed-length character data of the predetermined length converted through the program of the conversion apparatus 10 or the data in the internal format delivered to the middleware, a predetermined process is performed in a state that the data area length is maintained. The fixed-length character data illustrated in FIG. 1 is converted again to the variable-length character data through, for example, the program of the conversion apparatus 10 in the middleware. The variable-length character data converted by the program of the conversion apparatus 10 includes the variation selector, and the variable-length character data is given to the OS to display or output a character based on the variable-length character data on a display device or the like included in the information processing apparatus.

The conversion apparatus 10 of the present embodiment allows the developer or the like of the application that treats the variation selectors to perform the development operation without regard to the area length of the character code. Therefore, the developer or the like of the application can reduce the management burden of the character code. As a result, the productivity for developing the application that treats the characters can be improved.

Figure 3:
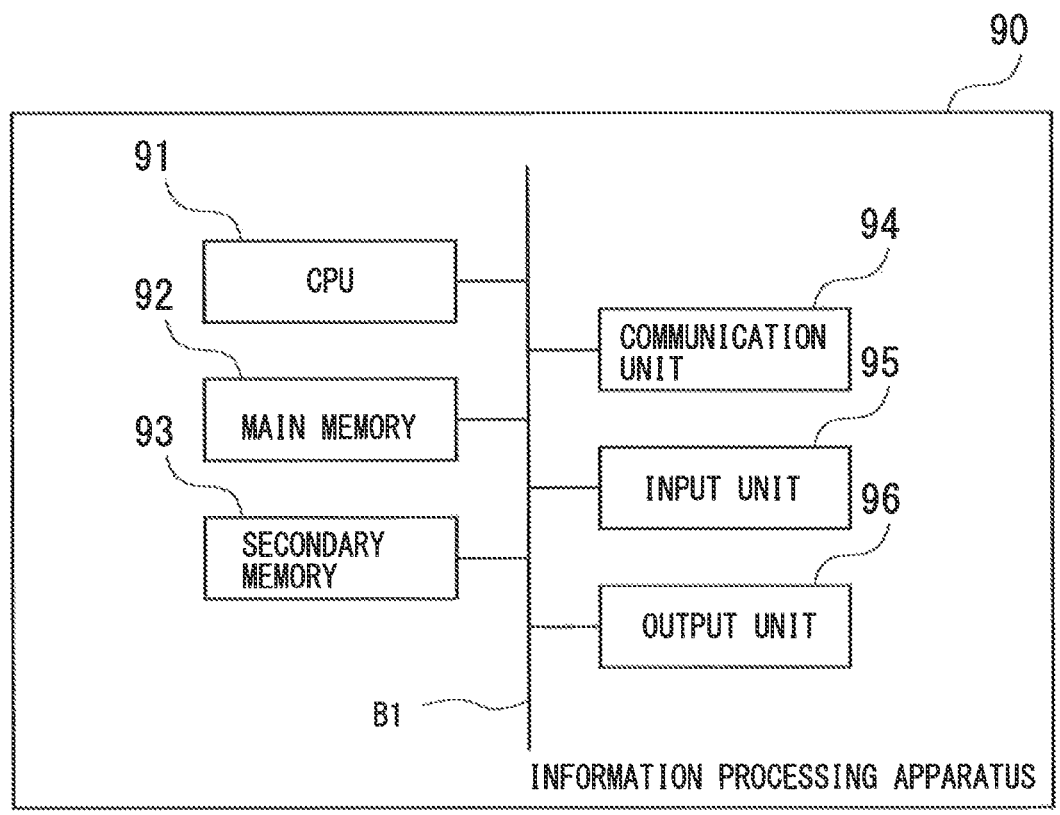
FIG. 3 is a diagram illustrating a hardware configuration of an information processing apparatus.

For example, the conversion apparatus 10 of the present embodiment is implemented on an information processing apparatus 90 as a computer illustrated in FIG. 3. FIG. 3 illustrates a configuration of hardware of the information processing apparatus 90. The illustrated information processing apparatus 90 includes a Central Processing Unit (CPU) 91, a main storage unit (main memory) 92, an auxiliary storage unit (external memory) 93, a communication unit 94, an input unit 95, and an output unit 96 that are connected to each other by a connection bus B1.

In the information processing unit 90, the CPU 91 expands a program stored in the auxiliary storage unit 93 to allow execution in a work area of the main storage unit 92, and the information processing apparatus 90 controls a peripheral device through the execution of the program. As a result, the information processing apparatus 90 can perform operations corresponding to a predetermined object. The main storage unit 92 and the auxiliary storage unit 93 are recording media that can be read by the information processing apparatus 90 as a computer.

The CPU 91 is a central processing unit that controls the entire information processing apparatus 90. The CPU 91 executes processes according to a program stored in the auxiliary storage unit 93. The main storage unit 92 is a storage medium for the CPU 91 to cache a program or data or to expand the operation area. The main storage unit 92 includes, for example, a Random Access Memory (RAM) and a Read Only Memory (ROM).

The auxiliary storage unit 93 stores various programs and various data in a recording medium in a manner that they can be freely read and written. The auxiliary storage unit 93 is also called an external storage device. An operation system (OS), various programs, various tables, and the like are stored in the auxiliary storage unit 93. The OS includes a communication interface program for transferring data with an external device or the like connected through the communication unit 94. Examples of the external device or the like include another information processing apparatus and an external storage device connected through a network or the like. The auxiliary storage unit 93 may be, for example, part of a cloud that is a group of computers on a network.

The auxiliary storage unit 93 is, for example, an Erasable Programmable ROM (EPROM), a solid-state drive (SSD) apparatus, a hard disk drive (HDD) apparatus, or the like. A Compact Disc (CD) drive apparatus, a Digital Versatile Disc (DVD) drive apparatus, a Blu-ray Disc (BD) drive apparatus, and the like can be presented as examples of the auxiliary storage unit 93. Examples of the recording medium include a silicon disk including a non-volatile semiconductor memory (flash memory), a hard disk, a CD, a DVD, a BD, a Universal Serial Bus (USB) memory, and the like. The communication unit 94 is, for example, an interface circuit with a network or the like.

The input unit 95 receives an operation instruction or the like from a user or the like. The input unit 95 is an input device, such as an input button, a keyboard, a pointing device, a wireless remote control, a microphone, and a camera. Information input from the input unit 95 is sent to the CPU 91 through the connection bus B1.

The output unit 96 outputs data processed by the CPU 91 and data stored in the main storage unit 92. The output unit 96 is an output device, such as a Cathode Ray Tube (CRT) display, a Liquid Crystal Display (LCD), a Plasma Display Panel (PDP), an Electroluminescence (EL) panel, and a printer.

In the information processing apparatus 90 illustrated in FIG. 3, the CPU 91 reads out the OS, various programs, and various data stored in the auxiliary storage unit 93 to the main storage unit 92 and executes these programs. By the execution of the programs, the information processing apparatus 90 operates as the conversion apparatus 10.

Functional Configuration

Figure 4:
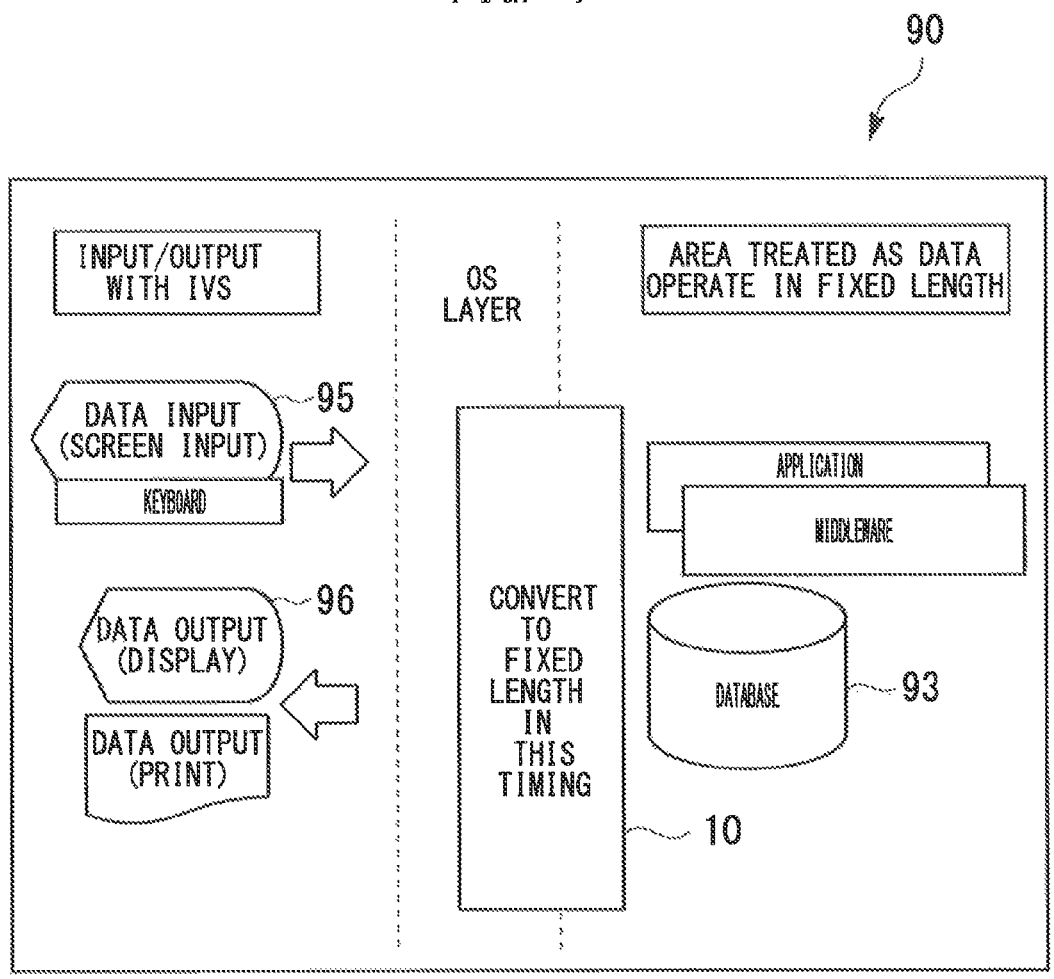
FIG. 4 is a diagram explaining a function of the conversion apparatus of the present embodiment.

FIG. 4 illustrates an explanatory view explaining a function of the conversion apparatus 10 of the present embodiment. In the conversion apparatus 10 of the present embodiment, a conversion process from a variable-length character code to a fixed-length character code is incorporated into an upstream for calling out an OS function and Application Programming Interfaces (API), and the conversion process from a variable length to a fixed length is executed. The upstream denotes, for example, the side closer to the middleware or the application program relative to the OS.

In the explanatory view illustrated in FIG. 4, the developer or the like (hereinafter, called "developer") of the business application that treats characters creates a character input unit through, for example, the input unit 95 or the like included in the information processing apparatus 30 that implements the conversion apparatus 10. The information processing apparatus 90 has an input and output function corresponding to Ideographic Variation Sequence (IVS) that can use the variation selector. In the IVS, the variation selector is added just after the character codes (Unicode; UTF8, UTF16, UTF32) of the basic character to express the variant. As described in FIG. 1, the character code of the basic character has a variable length of two to four bytes, and the variation selector has a four-byte length. The area length of the character data inputted through the input unit 95 corresponding to the IVS is a variable length of two to eight bytes (including cases of characters without variants).

The conversion apparatus 10 of the present embodiment converts the inputted variable-length character data to the fixed-length character data prior to deliver the character data to the application called by the OS function and/or the API or the middleware. The application or the middleware receiving the fixed-length character data refers to, for example, a database or the like on the auxiliary storage unit 93 to execute a predetermined process based on the delivered fixed-length character data.

Meanwhile, the conversion apparatus 10 of the present embodiment converts the fixed-length character data processed by the application or the middleware to the variable-length character data prior to deliver the character data to the OS function, the API, or the like. The converted character data is output to the output unit 96 included in the information processing apparatus 90 operating the conversion apparatus 10 via the OS or the like. The output unit 96 corresponding to the IVS, such as a display screen of CRT or the like, can display a sentence or the like including a plurality of variants illustrated in FIG. 2B.

(Conversion Process)

Figure 5A:
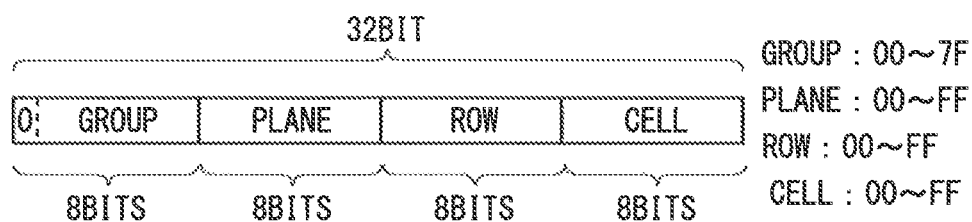
FIG. 5A is a diagram indicating a character code standard standardized by ISO.

Next, a conversion process of converting variable-length character data to fixed-length character data in the conversion apparatus 10 of the present embodiment will be described with reference to FIGS. 5A to 5C. FIG. 5A illustrates, as an example of character code standard, ISO/IEC 10646 (Universal Coded Character Set (UCS)) standardized by International Organization for Standardization (ISO). The character code (Unicode) of the basic character as a target of the conversion apparatus 10 of the present embodiment is part of the character code standard illustrated in FIG. 5A.

As illustrated in FIG. 5A, one character of the basic character is expressed by four bytes (32 bits) in ISO/IEC 10646, and the character is divided into four "octets" including a "group", a "plane", a "row", and a "cell" in order from high-order bits. As illustrated in FIG. 5A, since the highest-order bit of the "group" is fixed to "0", there are 128 (groups)×256 (planes)×256 (rows)×256 (cells) character codes that can be expressed by ISO/IEC 10646, and more than 2.1 billion characters can be identified. The four-byte expression format illustrated in FIG. 5A is also called UCS4.

The character code UTF32 expresses 1114112 characters that are subsets of UCS4 and all characters defined by JIS 2004 that are subsets of UTF32. Consequently, the characters expressed by UTF32 are expressed in a character range of "0x00000000" to "0x0010ffff" in UCS4. Therefore, UCS4 can express UTF32 by an amount of information of (5 bits for identifying 17 planes from 0-th plane to 16-th plane)+(16 bits that are character code of 2 bytes included in each plane)=21 bits.

Variation selectors corresponding to Japanese kanji (Chinese characters) are prepared in a range of "VS17" to "VS256", and one basic character can have up to 240 variation selectors. Therefore, the identification of a variant of a basic character can be made by an amount of information of eight bits.

The conversion apparatus 10 of the present embodiment generates fixed-length data expressed by an amount of information of, for example, four bytes (32 bits) from the information of 21 bits for expressing the character code and the information of eight bits for expressing the variant. The four-byte fixed-length data generated by the conversion apparatus 10 includes information of the character code of the basic character and the variation selector of the basic character.

The conversion apparatus 10 of the present embodiment extracts the information of 21 bits expressing the character code and the information of eight bits expressing the variant from the fixed-length data expressed by the amount of information of four bytes (32 bits) to generate variable-length character data. The variable-length character data generated by the conversion apparatus 10 is data having two to eight bytes including the character code of the basic character and the variation selector attached to the character code of the basic character.

The conversion apparatus 10 of the present embodiment generates the fixed-length data including the information of 21 bits expressing the character code and the information of eight bits expressing the variant by the following two processing systems (methods). In the description, it is assumed that the fixed-length data generated by the conversion apparatus 10 includes four bytes (32 bits). The variation selector number, such as "xxx" of "VSxxx (xxx is 17 to 256)", of the variation selector will be described as "n".

It can be stated that the expression format of the conversion apparatus 10 of the present embodiment is, for example, an extended expression that the basic character expressed by Unicode (UTF8, UTF16, UTF32) and the information expressing the variant of the basic character (for example, variation selector) are expressed by a fixed-length format having a predetermined length (for example, length of 32 bits). More specifically, as described in FIGS. 2A, 2B, and the like, when "character code of basic character"+"variation selector" is a standard expression, the variable-length character data expressed by the standard expression has a length of two to eight byte length (including a mode in which the basic character does not include variants). In the expression format of the conversion apparatus 10 of the present embodiment, the basic character is expressed by an amount of information of 21 bits. When there is a variant, the information of eight bits expressing the variant and the information of the basic character are integrated into data having a predetermined length to express the data as fixed-length data, as described above.

In the first embodiment, the format that includes a "character code of basic character"+a "variation selector" and a "character code of basic character" without variation selector and that is expressed by, for example, 32-bit fixed length is called an extended expression. The conversion apparatus 10 of the present embodiment determines whether an input character data string includes glyph variant information.

When the glyph variant information is detected from the input character data string, the conversion apparatus 10 converts the glyph variant information to extended expression data that includes the basic character associated with the glyph variant information and the glyph variant information and that can be converted to the basic character by specific bit arithmetic processing.

(Method 1)

In a method 1, the conversion apparatus 10 calculates a logical sum of the basic character expressed by the four-byte UTF32 code format illustrated in FIG. 5A and 32-bit data which is obtained by subtracting 1 from the variation selector number n and shifting the value (n−1) to the right by 24 bits. As a result, the conversion apparatus 10 can generate fixed-length data including 21-bit information to express the character code and eight-bit information to express the variant.

Figure 5B:
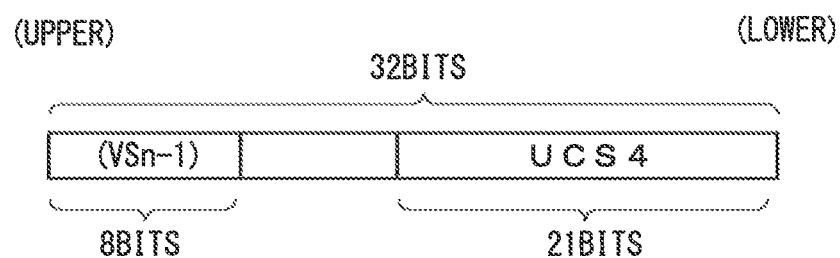
FIG. 5B is a diagram indicating an example of fixed-length data converted in a conversion process of the present embodiment.

FIG. 5B illustrates one example of four-byte fixed-length data generated in the process of the system 1. In the example of FIG. 5B, (n−1), which is a value obtained by subtracting 1 from the variation selector number n, is stored in an area of eight high-order bits of 32-bit data. In the example of FIG. 5B, the basic character expressed by the UTF32 code format is stored in an area of 21 low-order bits of the 32-bit data.

In this way, in the extended expression format of the method 1, the variable-length character data of the standard expression can be integrated and expressed by the extended expression of 32-bit fixed length including the information of the variant in the area of eight high-order bits and the information of the basic character in the area of 21 low-order bits. Therefore, the character data of "character code of basic character"+"variation selector" illustrated in FIGS. 2A and 2B can be treated in the data format of the extended expression having a predetermined length.

When, for example, the character does not include a variation selector, the fixed-length data generated in the system 1 becomes the basic character expressed by the UTF32 code format. Furthermore, for example, the conversion apparatus 10 can ignore the eight high-order bits by calculating the logical sum of the generated fixed-length data and the four-byte data of "0x00ffffff". Therefore, the expression of the UTF32 code of the basic character can be easily obtained.

(Method 2)

In a method 2, the conversion apparatus 10 calculates a logical sum of 32-bit data, which is obtained by subtracting 1 from the variation selector number n and storing the value (n−1) in eight low-order bits, and data, which is obtained by shifting the basic character expressed by four-byte UTF32 code format eight bits to the right. As a result, the conversion apparatus 10 can generate fixed-length data including 21-bit information expressing the character code and eight-bit information expressing the variant.

Figure 5C:
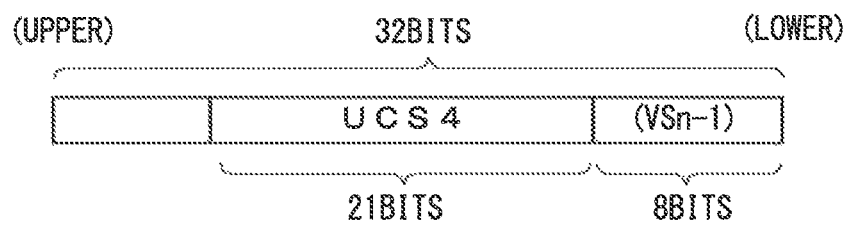
FIG. 5C is a diagram indicating an example of fixed-length data converted in a conversion process of the present embodiment.

FIG. 5C illustrates four-byte fixed-length data generated in the process of the system 2. In the example of FIG. 5C, (n−1), which is a value obtained by subtracting 1 from the variation selector number n, is stored in an area of eight low-order bits of 32-bit data. In the example of FIG. 5C, the basic character expressed by the UTF32 code format is stored in an area of 21 low-order bits adjacent to the high-order side of an area of eight low-order bits.

Thus, in the extended expression format of the method 2, the variable-length character data of the standard expression can be expressed by the extended expression having a fixed length (32 bit). The extended expression includes the information of the variant which is in the area of the eight low-order bits and the information of the basic character which is in the area of 21 bits adjacent to the high-order side of the area of the eight low-order bits. As in the method 1, the character data of the "character code of the basic character"+the "variation selector" illustrated in FIGS. 2A and 2B can be treated with the data format of the extended expression having a predetermined length.

In the fixed-length data generated in the method 2, for example, the data format of the character delivered to the conversion apparatus 10 through the input unit 95 corresponding to the IVS illustrated in FIG. 4 can be maintained. More specifically, in the fixed-length data illustrated in FIG. 5C, the variation selector information is stored in the area of eight low-order bits adjacent to the area of 21 bits expressing the character code. Therefore, the data format that the variation selector is added just after the basic character can be maintained. Thus, for example, the size comparison in sorting character strings or the like including variants is easy, and the same result as in the sorting using the data format of UTF32 can be obtained.

In the conversion apparatus 10 of the present embodiment, the information of eight bits for identifying the variation selector is expressed by a value obtained by subtracting "1" from the numerical value (n) of the variation selector number. Through the execution of the process, the conversion apparatus 10 of the present embodiment can treat the variation selector prepared in the range of "VS17" to "VS256" as eight-bit information of "0x10" to "0xff".

[Processing Flow]

(Variable-Length Data→Fixed-Length Data)

Figure 6:
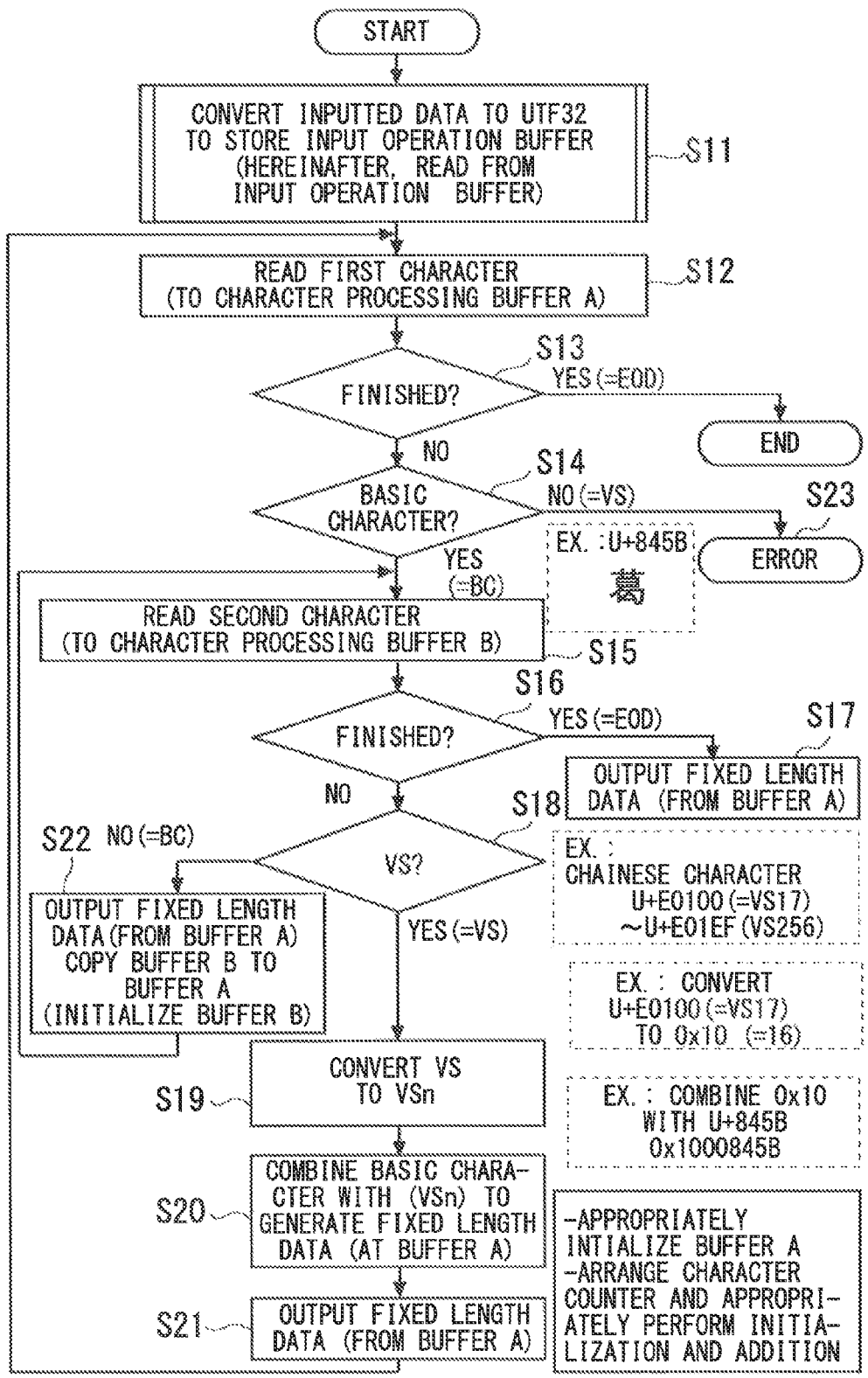
FIG. 6 is a flow chart illustrating a conversion process of the present embodiment.

A process by the conversion apparatus 10 of the present embodiment will be described with reference to a flow chart illustrated in FIG. 6. FIG. 6 illustrates a flow chart of one example of a process of converting variable-length data to fixed-length data. The process illustrated in FIG. 6 is executed by, for example, a computer program expanded in the main storage unit 92 for execution. In the flow chart illustrated in FIG. 6, processes of S12 to S23 are repeatedly executed until reading of input characters is finished.

In the flow chart illustrated in FIG. 6, for example, the processing from variable-length data to fixed-length data can be started by input of information from the outside to the middleware or the application program. The input from the outside is, for example, input from the keyboard, input of character information from the display screen, input by Optical Code Reader (OCR), data reception from another device through a communication module or the like, data reading from a portable recording medium, or the like.

The conversion apparatus 10 converts the input data to UTF32 and stores the converted data in an input operation buffer (S11). The input data is inputted through, for example, the input unit 94 corresponding to the IVS as described in FIG. 4. Therefore, the input data is delivered to the conversion apparatus 10 of the present embodiment as the variable-length data with the variation selector just after the character code (Unicode) of the basic character. The input operation buffer is arranged in, for example, a predetermined storage area of the main storage unit 92. The processes of S12 to S23 are executed for the input data stored in the input operation buffer in the process of S11.

In S12 and S13, the conversion apparatus 10 reads a first character from the input operation buffer and stores the read character in a character processing buffer A (S12). The character processing buffer A is arranged in, for example, a predetermined storage area of the main storage unit 92. The conversion apparatus 10 determines whether the reading of the characters from the input operation buffer is finished (S13). The determining in S13 may be made by, for example, detecting End of Data (EOD) or the like indicating the end of the data.

When the reading of the characters from the input operation buffer is finished (S13, YES), the conversion apparatus 10 ends the processing illustrated in FIG. 6. On the other hand, when the reading of the characters is not finished (S13, NO), the conversion apparatus 10 determines whether the first character read in the process of S12 is a basic character or not (S14). When the first character read in the process of S12 is not a basic character (S14, NO), the processing moves to S23 to execute error processing.

As already described, the input data delivered to the conversion apparatus 10 is the variable-length data in which the variation selector is added just after the character code (Unicode) of the basic character. Therefore, when the information processing apparatus 90 including the conversion apparatus 10 is in a normal state, the first character is a character code of a basic character, and a second character is a variation selector of the basic character. Thus, when the character read as the first character is not a basic character in the process of S14, the conversion apparatus 10 of the present embodiment determines that the information processing apparatus 90 including the conversion apparatus 10 has an error and error processing is executed in S23.

On the other hand, when the first character read in the process of S12 is a basic character (S14, YES), the conversion apparatus 10 reads a second character from the input operation buffer and stores the read second character in a character processing buffer B (S15). The character processing buffer B is arranged in, for example, a predetermined storage area of the main storage unit 92. The conversion apparatus 10 determines again whether the reading of the characters from the input operation buffer is finished (S16).

When the reading of the characters is finished (S16, YES), the conversion apparatus 10 outputs fixed-length data from the character processing buffer A in S17 without executing a conversion process of the variation selector of S18 to S22.

On the other hand, when the reading of the characters is not finished (S16, NO), the conversion apparatus 10 executes the conversion process of the variation selector of S18 to S21. In S18, the conversion apparatus 10 determines whether the second character read in S15 is a variation selector. For example, the variation selectors of Chinese character (Japanese kanji) are prepared in a range of "VS17" to "VS256". For example, when the variation selectors (VS) are expressed by Unicode, "U+E0100" corresponds to "VS17", and "U+E01EF" corresponds to "VS256". The conversion apparatus 10 can, for example, determine whether the second character read in S15 is expressed in the range of "U+E0100" to "U+E01EF". The CPU 91 or the like of the information processing apparatus 90 executes the process of S18 as an example of a detecting unit.

As a result of the determination in S18, when it is determined that the second character read in S15 is not a variation selector (S18, NO), the conversion apparatus 10 reads the fixed-length character data from the character processing buffer A and the processing proceeds to S15 (S22). In a process of S22, the conversion apparatus 10 copies the data of the second character stored in the character processing buffer B to the character processing buffer A. In the copying process of S22, the conversion apparatus 10 may further initialize the character processing buffer B.

On the other hand, as a result of the determination in S18, when it is determined that the second character read in S15 is a variation selector (S18, YES), the processing proceeds to S19 and the conversion apparatus converts the variation selector (VS) to a variation selector number (VSn). For example, when the variation selector is "VS17", the variation selector number "VSn" is "17". In S19, the conversion apparatus 10 calculates "VSn−1" from the variation selector number "VSn" as described in FIG. 5B and the like and converts the information to hexadecimal eight-bit information. When the variation selector number "VSn" is "17", "VSn−1" is "16", which is "0x10" in the hexadecimal eight-bit information. When the variation selector number "VSn" is "256", "VSn−1" is "255", which is "0xff" in the hexadecimal eight-bit information. In this way, "VSn−1" is output as a value in the range of "16" to "255" in the process of S19. The process is an example of bit shift processing for expressing the variation selector number by a small number of bits.

In a process of S20, the conversion apparatus 10 combines the data of the first character read in the process of S12 and the variation selector number (VSn) converted in the process of S19 to obtain fixed-length data. For example, in the method 1, the conversion apparatus 10 can set 32-bit data by shifting "VSn−1" converted in the process of S19 to the right by 24 bits and calculate a logical sum of the data and the four-byte basic character data stored in the character processing buffer A in S12. The process of calculating the logical sum is executed at, for example, the character processing buffer A. As a result, the fixed-length data is generated in the character processing buffer A by combining the data of the first character read in the process of S12 and the variation selector number (VSn) converted in the process of S19.

In the method 2, for example, the conversion apparatus 10 shifts the four-byte basic character data stored in the character processing buffer A in S12 to the right by eight bits. The conversion apparatus 10 can calculate a logical sum of the basic character data shifted eight bits to the right and the 32-bit data storing "VSn−1" converted in the process of S19 in the eight low-order bits. The process of calculating the logical sum is executed at, for example, the character processing buffer A. As a result, as in the method 1, the fixed-length data is generated in the character processing buffer A by combining the data of the first character read in the process of S12 and the variation selector number (VSn) converted in the process of S19.

In the process of S21, the conversion apparatus 10 outputs the fixed-length data generated in the process of S19 from the character processing buffer A. The processing proceeds to S12 and the conversion apparatus 10 repeats the processes of S12 to S23 until the character data stored in the input operation buffer is finished.

In the process illustrated in FIG. 6, the conversion apparatus 10 may include, for example, a character counter or the like. The character counter counts the number of characters. The character counter appropriately performs initialization and addition according to the process of the input unit 94.

The process of S11 executed by the conversion apparatus 10 is an example of obtaining character data of a variable-length character code including an identification code of a character and a variant identification code for identifying a variant of the character, wherein the variable-length character code has a code length according to the character. The CPU 91 or the like of the information processing apparatus 90 executes the process of S11 as an example of an obtaining unit configured to character data of a variable-length character code including an identification code of a character and a variant identification code for identifying a variant of the character, wherein the variable-length character code has a code length according to the character.

The process of S19 and S20 executed by the conversion apparatus 10 is an example of converting the glyph variant information to extended expression data that includes a basic character associated with the glyph variant information and the variation information and that can be converted to the basic character by specific bit arithmetic processing. The CPU 91 or the like of the information processing apparatus 90 executes the processes of S19 and S20 as an example of a converting unit configured to convert the glyph variant information to extended expression data that includes a basic character associated with the glyph variant information and the glyph variant information and that can be converted to the basic character by specific bit arithmetic processing.

The process of S21 executed by the conversion apparatus 10 is an example of delivering. The CPU 91 or the like of the information processing apparatus 90 executes the process of S21 as an example of a delivering unit.

(Fixed-Length Data→Variable-Length Data)

Figure 7:
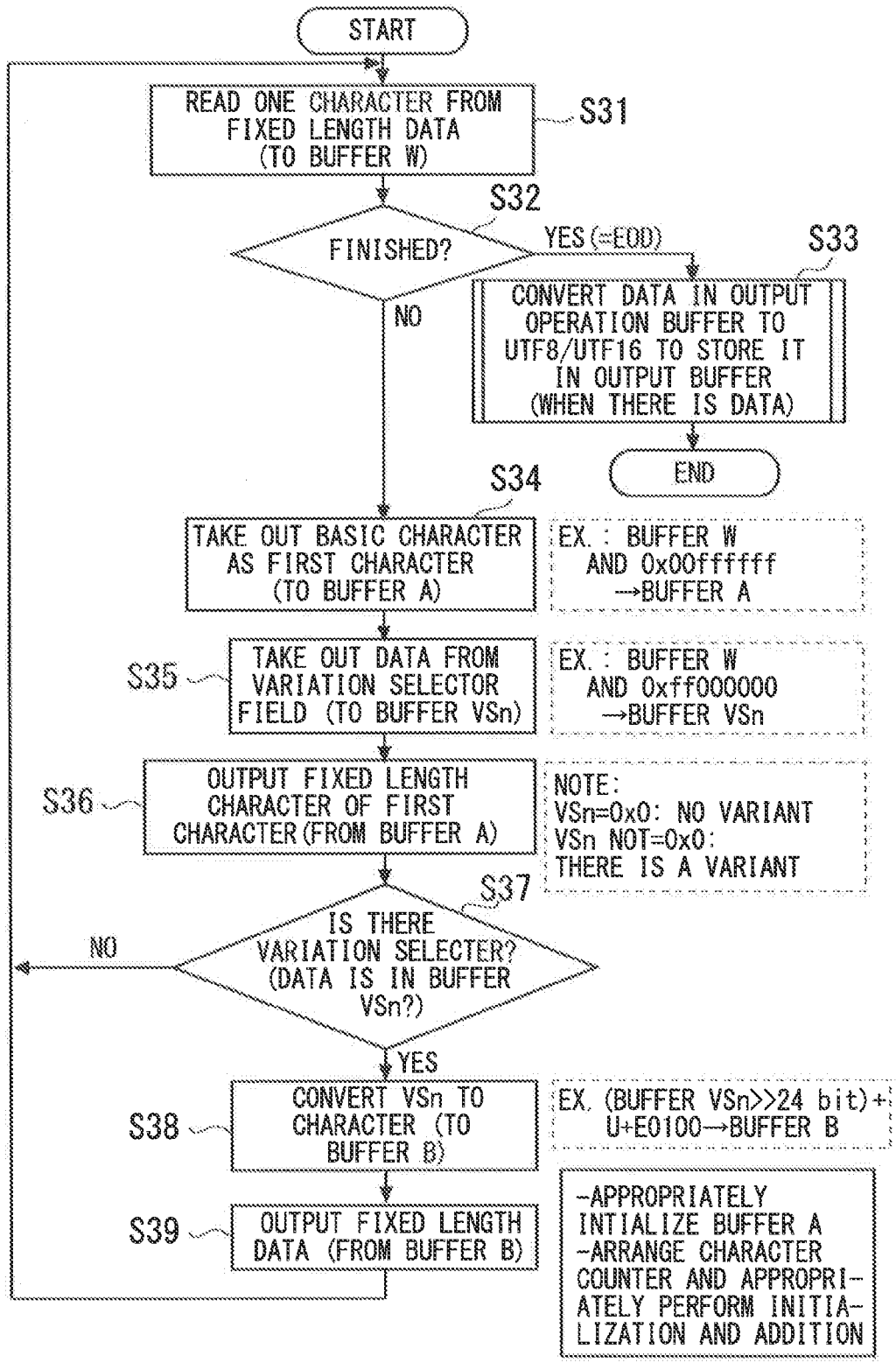
FIG. 7 is a flow chart illustrating a conversion process of the present embodiment.

A process of converting fixed length data to variable-length data by the conversion apparatus 10 of the present embodiment will be described with reference to a flow chart illustrated in FIG. 7. FIG. 7 illustrates a flow chart of a conversion process. The process illustrated in FIG. 7 is executed by, for example, a computer program expanded in the main storage unit 92 to allow execution. In the flow chart illustrated in FIG. 7, processes S31 to S39 are repeatedly executed until reading of characters of fixed-length data is finished.

The fixed-length data includes, for example, the 21-bit information expressing the basic character and the eight-bit information expressing the variation selector as described in FIG. 6. In the process of converting fixed length to variable-length data as illustrated in FIG. 7, the conversion apparatus 10 extracts the information from the fixed-length data to generate and output variable-length data corresponding to the extracted information.

In the flow chart illustrated in FIG. 7, the start of the process from the fixed-length data to the variable-length data can be, for example, output of information from the middleware or the application program to the outside. The output to the outside is, for example, output to a display device, a printer, or the like, transmission of information to another device through a communication module, or the like.

The conversion apparatus 10 reads a first character of the fixed-length data and stores the first character in a character processing buffer W (S31). As a result of the process of S31, the fixed-length data of the first character stored in the character processing buffer W includes the character code of the basic character and the variation selector. The character processing buffer W is arranged in, for example, a predetermined storage area of the main storage unit 92. In the following description, each buffer is arranged in a predetermined storage area of the main storage unit 92. The process of S31 executed by the conversion apparatus 10 is an example of a step of obtaining extended expression data. The CPU 91 or the like of the information processing apparatus 90 executes the process of S31 as an example of means for obtaining extended expression data.

In the process of S32, the conversion apparatus 10 determines whether reading of the characters is finished. When the reading of the characters is finished (S32, YES), the conversion apparatus 10 converts data in an output operation buffer to UTF8 or UTF18 and stores the data in an output buffer (S33). After the execution of the process of S33, the conversion apparatus 10 ends the process illustrated in FIG. 7.

On the other hand, when the reading of the characters is not finished (S32, NO), the conversion apparatus 10 extracts a basic character as a first character of variable-length data from the fixed-length data stored in the character processing buffer W (S34).

The conversion apparatus 10 calculates, for example, a logical product (AND) of the data stored in the character processing buffer W and the 32-bit data indicated by "0x00ffffff" and stores the obtained processing result in the character processing buffer A. As a result of the process, the conversion apparatus 10 can extract, for example, the character data of the basic character from the fixed-length data converted in the method 1.

The conversion apparatus 10 calculates, for example, a logical product (AND) of the data stored in the character processing buffer W and the 32-bit data indicated by "0xffffff00" and stores the obtained processing result in the character processing buffer A. The conversion apparatus 10 shifts the data stored in the character processing buffer A eight bits to the left. As a result of the process, the conversion apparatus 10 can, for example, extract the character data of the basic character from the fixed-length data converted in the method 2.

Next, the conversion apparatus 10 extracts data related to the variation selector to be added to the basic character, from the fixed-length data stored in the character processing buffer W (S35). The data related to the variation selector is, for example, "VSn−1" obtained by subtracting "1" from the variation selector number "VSn".

The conversion apparatus 10 calculates, for example, a logical product (AND) of the data stored in the character processing buffer W and the 32-bit data indicated by "0xff000000" and stores the obtained processing result in a buffer VSn. As a result of the process, the conversion apparatus 10 can, for example, extract the data related to the variation selector from the fixed-length data converted in the system 1.

The conversion apparatus 10 calculates, for example, a logical product (AND) of the data stored in the character processing buffer W and the 32-bit data indicated by "0x000000ff" and stores the obtained processing result in the buffer VSn. As a result of the process, the conversion apparatus 10 can, for example, extract the data related to the variation selector from the fixed-length data converted in the system 2.

In the process of S36, the conversion apparatus 10 outputs the 32-bit data (fixed length) of the basic character (first character of variable-length data) extracted in the process of S34 from the character processing buffer A to the output operation buffer. After the execution of the process of S36, the process proceeds to S37, and when a predetermined condition is satisfied (S37, YES), the conversion apparatus 10 executes a process of conversion to variation selector of S38 and S39.

In the process of S37, the conversion apparatus 10 determines whether there is a variation selector. For example, when there is a variation selector, "1" is subtracted from "VSn" that is the variation selector number, and "VSn−1" is stored in the buffer VSn, for example. Here, "VSn−1" is a value in a range of 16 to 255 ("0x10" to "0xff") as described in FIG. 6. Therefore, in the process of S37, the conversion apparatus 10 can determine that there is no variation selector when the data stored in the buffer VSn in the process of S35 is "0x0". The conversion apparatus 10 may determine that there is a variation selector when the data stored in the buffer VSn in the process of S35 is not "0x0".

As a result of the determination of the process of S37, when there is no variation selector (S37, NO), the process proceeds to S31 and the conversion apparatus 10 repeats the processes of S31 to S39. On the other hand, as a result of the determination of the process of S37, when there is a variation selector (S37, YES), the conversion apparatus 10 converts the variation selector number (VSn) to a character based on the value stored in the buffer VSn (S38). The converted variation selector number (VSn) is stored in the character processing buffer B.

In the process of S38, the conversion apparatus 10 adds "1" after shifting the data of the buffer VSn 24 bits to the left and stores the data in the character processing buffer B, for example. As a result of the process, the conversion apparatus 10 can, for example, extract the variation selector number (VSn) from the fixed-length data converted in the method 1.

The conversion apparatus 10, for example, adds "1" to the data of the buffer VSn and stores the data in the character processing buffer B. As a result of the process, the conversion apparatus 10 can, for example, extract the variation selector number (VSn) from the fixed-length data converted in the method 2.

The conversion apparatus 10 further converts the variation selector number (VSn) extracted to the character processing buffer B to character data and stores the character data again in the character processing buffer B. As a result, character data expressing the variation selector, such as "U+E0100", is stored in the character processing buffer B, for example. "U+E0100" is a character code corresponding to the variation selector number (VS17).

In the process of S39, the conversion apparatus 10 outputs the character data expressing the variation selector stored in the character processing buffer B to the output operation buffer and moves to S31. The conversion apparatus 10 can again repeat the processes of S31 to S39 to convert the data related to the basic character and the variation selector included in the fixed-length data to variable-length data expressed by "basic character+variation selector". The character data output to the output operation buffer is stored in the output buffer on the condition that it is determined that the reading of the characters is finished in S32.

In the process illustrated in FIG. 6, the conversion apparatus 10 may include, for example, a character counter or the like. In the process illustrated in FIG. 6, the conversion apparatus 10 may include, for example, a character counter or the like. The character counter counts the number of characters. The character counter appropriately performs initialization and addition according to the process of the input unit 94.

The process of S34 to S38 executed by the conversion apparatus 10 is an example of converting to a character data string in a standard expression. The CPU 91 or the like of the information processing apparatus 90 executes the process of S34 to S38 as an example of a conversion unit to a character data string in a standard expression.

More specifically, the fixed-length character code generated by the conversion apparatus 10 is a fixed-length character code that can restore the original variable-length character code including the identification code of the character and the variant identification code of the character. The conversion apparatus 10 converts the character data from the variable-length character code to the fixed-length character code that can restore the variable-length character code. As a result of the process, the conversion apparatus 10 can treat, in a fixed-length character code, the character data of the variable-length character code including the variant.

Example of Operation

Compiler

Figure 8A:
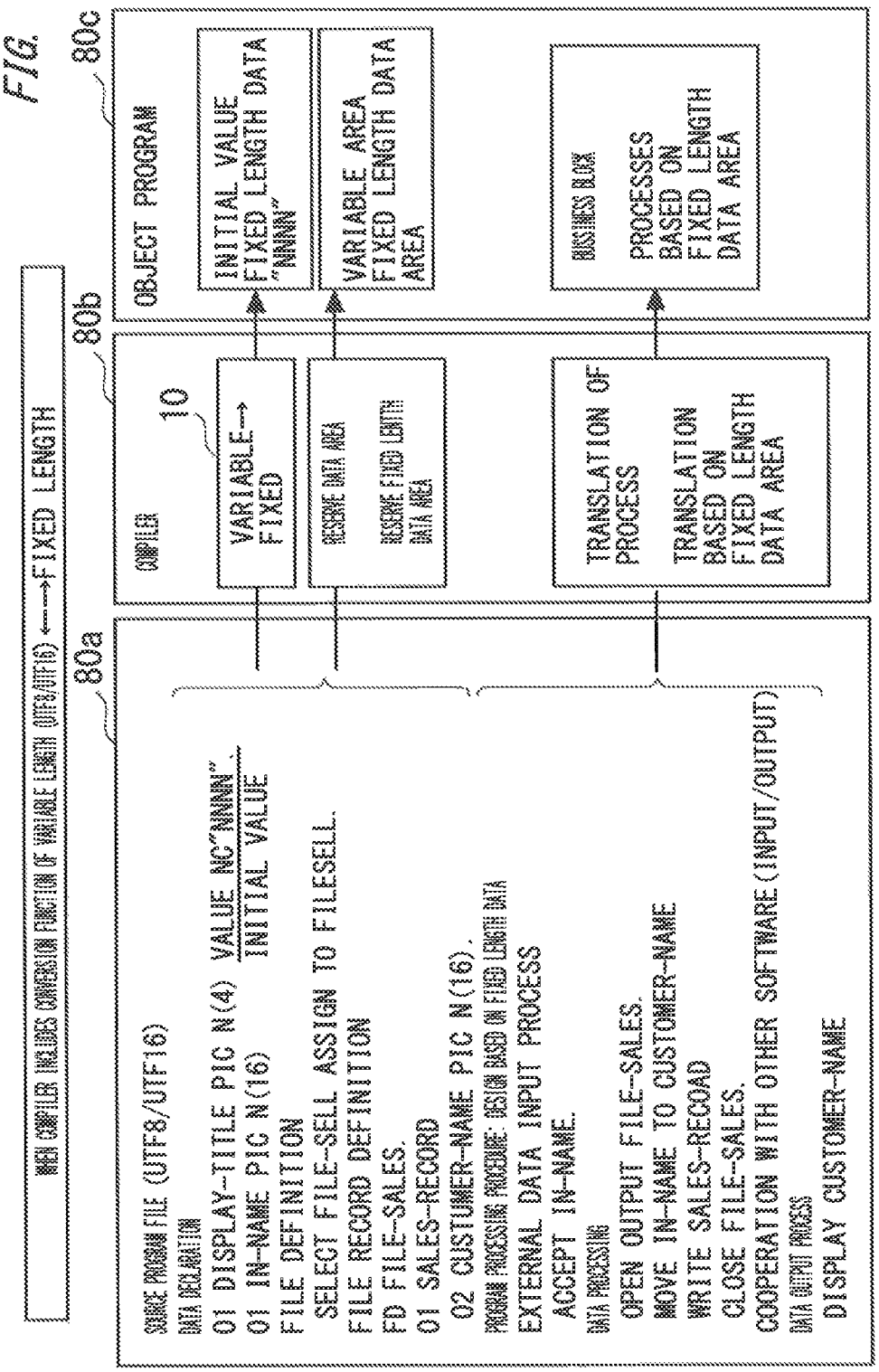
FIG. 8A is a diagram explaining operation of a case in which the conversion apparatus of the present embodiment is incorporated into a compiler.

FIG. 8A illustrates an explanatory view of a case in which the conversion apparatus 10 of the present embodiment is incorporated into a compiler. In the explanatory view illustrated in FIG. 8A, a source program file 80a is, for example, a program including character codes expressed by UTF8 and UTF16. A compiler 80b includes the conversion apparatus 10 of the present embodiment. The compiler 80b converts a source code of the source program file 80a to generate an application (object program) 80c written in an object code executable by a computer. The object program 80c is, for example, an application executable by the information processing apparatus 90.

In the source program file 80a of FIG. 8A, data declaration treated in the program is performed, an initial value is set, environment variables such as a file name are defined, and a file record and the like are defined. The data declaration includes, for example, a character string "NNNN" expressed by UTF8 and UTF16. In the source program file 80a, various processes regarding input and output of data, processes regarding data processing, cooperation (for example, data input and output) with other software, and the like are written. An example of the processes regarding input and output of data includes a process of inputting external data written by "ACCEPT IN-NAME" or the like.

The compiler 80b illustrated in FIG. 8A reserves a data area at the execution of compile processing, according to the file definition, the file record definition, and the like of the source program file 80a. The reserved data area is a fixed-length data area. The compiler 80b executes a translation process to an object code executable by the computer according to the source code regarding various processes of the source program file 80a. In the translation process, a fixed-length data area is reserved according to the source code regarding various processes, and a translation process is executed based on the fixed-length data area.

The conversion apparatus 10 incorporated into the compiler 80b executes the following conversion process of character data at the execution of the compile processing. For example, the conversion apparatus 10 of the compiler 80b converts the variable-length character string "NNNN" or the like expressed by UTF8, UTF16, or the like included in the data declaration or the like of the source program file 80a to UTF32 and stores it in the input operation buffer (FIG. 6, S11). The conversion apparatus 10 executes a process of reading a first character in the input operation buffer and stores the character in the character processing buffer A (FIG. 6, S12). If a predetermined condition is satisfied (FIG. 6, S13, NO, S14, YES), the conversion apparatus 10 reads a second character and stores the character in the character processing buffer B (FIG. 6, S16). When the second character is not a variation selector (VS), the conversion apparatus 10 outputs the first character stored in the character processing buffer A to the object program 80c. The conversion apparatus 10 copies the character processing buffer B to the character processing buffer A and executes the initialization process of the character processing buffer B (FIG. 6, S18, NO—S22).

At the execution of the compile processing, when the second character is a variation selector (VS), the conversion apparatus 10 converts the variation selector (VS) expressed by Unicode to a variation selector number (VSn) (FIG. 6, S18, YES—S19). The conversion apparatus 10 combines the basic character of the first character stored in the character processing buffer A and the variation selector number (VSn) to obtain fixed-length data and outputs the combined fixed-length data to the object program 80c (FIG. 6, S20-S21).

The compiler 80b illustrated in FIG. 8A, for example, associates a call function for calling out the compiler process as a RUNTIME system according to the source code regarding the process of inputting external data such as "ACCEPT IN-NAME".

As a result of the process by the compiler 80b, a character string such as "NNNN" declared in the source program file 80a is set as an initial value of fixed-length data in the object program 80c. A variable area and a fixed-length data area according to the file definition and the like of the source program file 80a are set in the object program 80c. A fixed-length data area and a process based on the fixed-length data area are incorporated into an execution area (business block) of the object program.

Figure 8B:
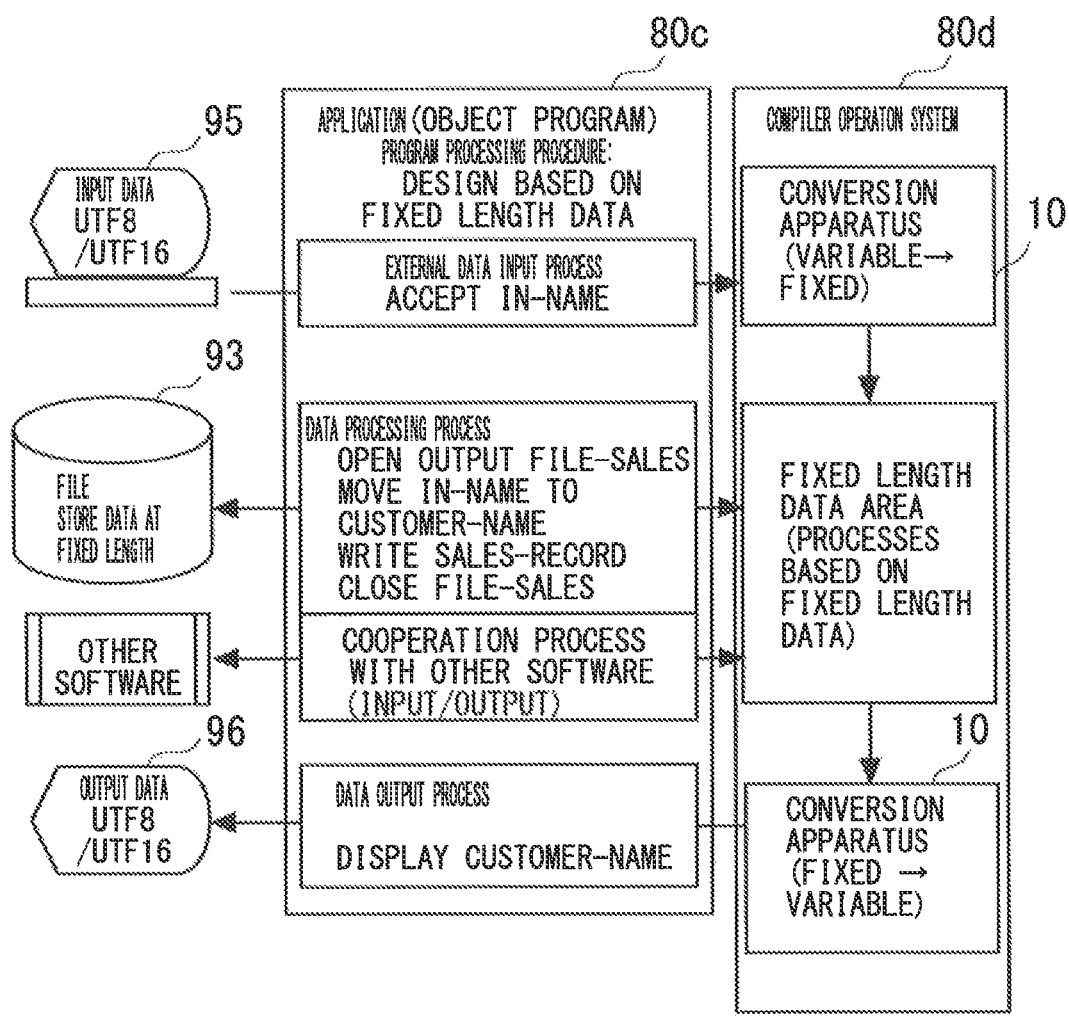
FIG. 8B is a diagram explaining operation of a case in which the conversion apparatus of the present embodiment is incorporated into a compiler.

FIG. 8B is a diagram explaining execution of the object program 80c of FIG. 8A. In FIG. 8B, a compiler operation system 80d is a RUNTIME system called out by "ACCEPT IN-NAME". The object program 80c illustrated in FIG. 8B is executed by, for example, the information processing apparatus 90.

In the explanatory view illustrated in FIG. 8B, for example, character data input expressed by UTF8 or UTF16 is performed through the input unit 95 included in the information processing apparatus 90. The object program 80c receives the input character data through an external data input process. As a result of the execution of the external data input process of the object program 80c, the call function and the like associated with "ACCEPT IN-NAME" are called out, and the compiler operation system 80d is activated. In the activated compiler operation system 80d, the process of the compiler 80b described in FIG. 8A is executed.

The conversion apparatus 10 incorporated into the compiler 80b converts the variable-length character data expressed by UTF8, UTF16, or the like to UTF32 and stores the data in the input operation buffer (FIG. 6, S11). The conversion apparatus 10 executes the processes of S12 to S23 of FIG. 6 to convert the variable-length character data input through the input unit 95 to fixed-length data.

The object program 80c executes predetermined data processing and cooperative processing with other software based on the converted fixed-length data. For example, through the execution of the object program 80c, the information processing apparatus 90 writes the fixed-length data in a file and stores the file including the fixed-length data in the auxiliary storage unit 93. The information processing apparatus 90 that executes the object program 80c executes an input and output process based on the fixed-length data area in the cooperative processing with other software.

As a result of the data processing, when, for example, the data is to be output to the output unit 96 included in the information processing apparatus 90, the compiler 80b converts the fixed-length data to variable-length data and outputs the data to the object program 80c. The conversion apparatus 10 incorporated into the compiler 80b executes the following conversion process regarding character data.

For example, the conversion apparatus 10 of the compiler 80b reads the first character of the fixed-length data and stores the first character in the character processing buffer W (FIG. 7, S31). When a predetermined condition is satisfied, the conversion apparatus 10 extracts the basic character as the first character of the variable-length data from the fixed-length data stored in the character processing buffer W and stores the extracted basic character in the character processing buffer A (FIG. 7, S34). The conversion apparatus 10 extracts the data of the variation selector to be added to the basic character from the fixed-length data stored in the character processing buffer W and stores the data in the buffer VSn (FIG. 7, S35).

The conversion apparatus 10 outputs the fixed-length data (USC4) of the first character from the buffer VSn to the output operation buffer (FIG. 7, S36) and converts the variation selector number (VSn) stored in the buffer VSn to character data when there is a variation selector. The converted character data is stored in the character processing buffer B (FIG. 7, S38). The conversion apparatus 10 outputs the character data (USC4) of the variation selector stored in the character processing buffer B to the output operation buffer (FIG. 7, S39).

The basic character data of the first character output to the output operation buffer and the character data expressing the variation selector are converted to UTF8 or UTF16 and stored in the output buffer when reading of the characters of the fixed-length data is finished (FIG. 7, S33). The character data stored in the output buffer and converted to UTF8 or UTF16 is output to a data output process of the object program 80c.

In the data output process of the object program 80c, the variable-length character data converted to UTF8 or UTF16 is output on the display screen of the output unit 96. When the basic character includes a variation selector, the variation selector is added just after the basic character, and the character data is output.

(Middleware)

Figure 9:
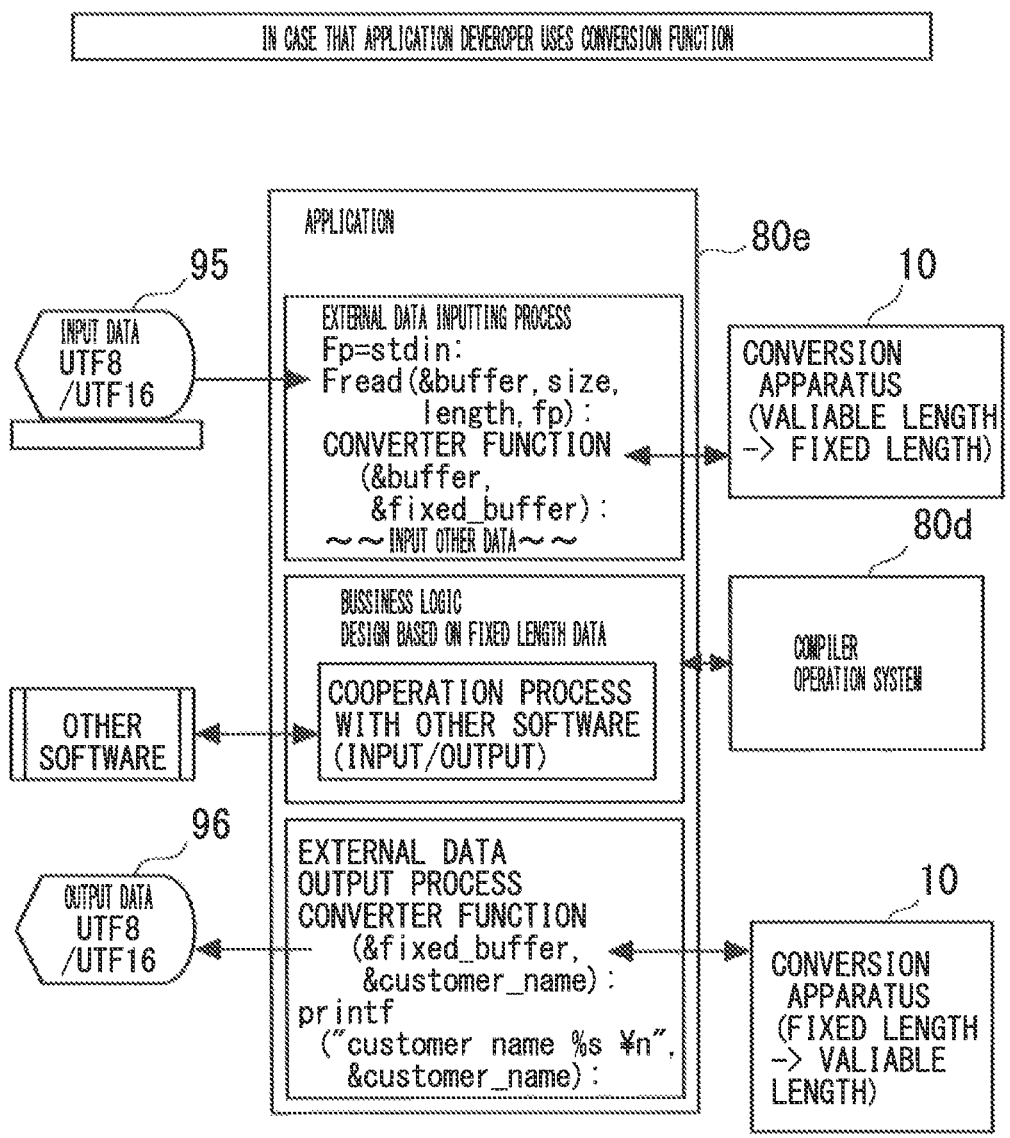
FIG. 9 is a diagram explaining operation of a case in which the conversion apparatus of the present embodiment is incorporated into middleware.

FIG. 9 illustrates an explanatory view of a case in which the conversion apparatus 10 of the present embodiment is incorporated into middleware. The case of FIG. 9 is a case in which, for example, the developer or the like of a business application that treats characters calls out and uses the conversion function of the conversion apparatus 10 incorporated into the middleware of the information processing apparatus 90.

An application 80e of FIG. 9 is, for example, an application program designed by the developer or the like. The developer or the like, for example, inputs character data expressed by UTF8 or UTF16 through the input unit 95 included in the information processing apparatus 90. In the application 80e, the conversion apparatus 10 incorporated into the middleware is associated, as a converter function, with an external data input process. In the external data input process illustrated in FIG. 9, "CONVERTER FUNCTION (&buffer, &fixed_buffer);" associates, as a converter function, the conversion apparatus 10 incorporated into the middleware.

In the application 80e, the conversion apparatus 10 called out by a request of the external data input process converts the variable-length character data expressed by UTF8, UTF16, or the like to UTF32 and stores the data in the input operation buffer (FIG. 6, S11). The conversion apparatus 10 executes the processes of S12 to S23 of FIG. 6 to convert the variable-length character data input through the input unit 95 to fixed-length data. The converted fixed-length data is output to the external data input process of the application 80e.

In the application 80e, for example, the data processing and the cooperative processing with other software are designed based on a fixed-length data area. When variable-length data of input and output is converted to fixed-length data in the cooperative processing with other software, the developer or the like may associate, as a call function, the compiler operation system 80d illustrated in FIG. 8B with the cooperative processing, for example.

In the application 80e, when the character data processed by the fixed-length data is to be output to the output unit 96, the conversion apparatus 10 incorporated into the middleware is associated, as a converter function, with an external data output process. In the external data output process illustrated in FIG. 9, "CONVERTER FUNCTION (&fixed_buffer, &customer_name);" associates, as a converter function, the conversion apparatus 10 incorporated into the middleware.

In the application 80e, the conversion apparatus 10 called out by a request of the external data output process reads the first character of the fixed-length data and stores the first character in the character processing buffer W (FIG. 7, S31). The conversion apparatus 10 executes the processes S32 to S39 of FIG. 7 to convert the character data processed as fixed-length data to variable-length character data. The converted variable-length data is output to the external data output process of the application 80e.

In the application 80e, the converted variable-length character data is output to the output unit 96 based on a predetermined function. In the external data processing illustrated in FIG. 9, the converted variable-length character data is output to the output unit 96 based on a function such as "printf ("customer name%s \n", &customer_name);".

As described, the conversion apparatus 10 of the present embodiment can convert character data of two to eight bytes including a basic character and a variation selector to fixed-length data including data of the character code of the basic character and the variation selector. Therefore, internal processing using the converted fixed-length data is possible in a program handling Japanese of n characters, DB definition, form definition, and the like. As a result, the function of the conversion apparatus 10 of the present embodiment can be incorporated into middleware, a compiler, or the like to rebuild, without major reviews, the business system and the business application designed based on fixed-length Japanese character strings.

Although the input data is converted to UTF32 and stored in the input operation buffer in S11 of FIG. 6, the input data may be stored in a format of a basic character expressed by UTF8 or UTF16 or in a format of the basic character provided with a variation selector.

<<Computer-Readable Recording Medium>>

A program for causing a computer or other machines or devices (hereinafter, "computer or the like") to implement any of the functions can be recorded in a recording medium readable by the computer or the like. The functions can be provided by causing the computer or the like to read and execute the program of the recording medium.

The recording medium readable by the computer or the like is a recording medium that can accumulate information of data, programs, and the like by electrical, magnetic, optical, mechanical, or chemical actions and that can be read from the computer or the like. Examples of the recording medium that can be removed from the computer or the like include a flexible disk, a magneto-optical disk, a CD-ROM, a CD-R/W, a DVD, a blu-ray disk, a DAT, an 8 mm tape, a memory card such a flash memory, and the like. Examples of the recording medium fixed to the computer or the like include a hard disk, a ROM, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A character data processing method executed by a computer, the method comprising:
    detecting glyph variant information from an input character data string; and
    converting detected glyph variant information to extended expression data, the extended expression data including basic character data and the detected glyph variant information, the basic character data being associated with the detected glyph variant information in the input character string,
    wherein the extended expression data can be converted to the basic character data by specific bit arithmetic processing,
    the method further comprising:
    delivering the extended expression data obtained by the converting to a processing unit to perform processing of the extended expression data;
    obtaining the extended expression data that the processing of the processing unit has been performed; and
    converting the obtained extended expression data to a character data string of a standard expression including glyph variant information and a basic character data associated with the glyph variant information.

2. The character data processing method according to claim 1, wherein the extended expression data includes a value obtained by shifting of predetermined bits of a variant identification code value included in the glyph variant information.

3. An information processing method executed by a computer, the method comprising: obtaining character data of a variable-length character code including an identification code of a character and a variant identification code for identifying a variant of the character, the variable-length character code having a code length corresponding to the character; and generating, based on the identification code of the character and the variant identification code of the character, a fixed-length character code that can restore the identification code of the character and the variant identification code to convert the character data of the variable-length character code to character data of the fixed-length code.

4. A non-transitory computer-readable recording medium storing therein a program that causes a computer to execute a process comprising:
    detecting glyph variant information from an input character data string; and
    converting detected glyph variant information to extended expression data, the extended expression data including basic character data and the detected glyph variant information, the basic character data being associated with the detected glyph variant information in the input character string,
    wherein the extended expression data can be converted to the basic character data by specific bit arithmetic processing, the program causing the computer to execute the process further comprising:

delivering the extended expression data obtained by the converting to a processing unit to perform processing of the extended expression data;

obtaining the extended expression data that the processing of the processing unit has been performed; and converting the obtained extended expression data to a character data string of a standard expression including glyph variant information and basic character data associated with the glyph variant information.

5. The non-transitory computer-readable recording medium according to claim 4, wherein the extended expression data includes a value obtained by shifting of predetermined bits of a variant identification code value included in the glyph variant information.

6. An information processing apparatus, comprising a memory storing executable instructions; and a processor connected to the memory and configured to execute the instructions, execution of the instructions causes the processor to:

detect glyph variant information from an input character data string;

convert detected glyph variant information to extended expression data including basic character data and the detected glyph variant information, the basic character data being associated with the detected glyph variant information in the input character data string, wherein the extended expression data can be converted to the basic character data by specific bit arithmetic processing;

deliver the extended expression data obtained by the converting unit to a processing unit to perform processing of the extended expression data;

obtain the extended expression data that the processing of the processing unit has been performed; and convert the obtained extended expression data to a character data string of a standard expression including glyph variant information and basic character data associated with the glyph variant information.

7. The information processing apparatus according to claim 6, wherein the extended expression data includes a value obtained by shifting of predetermined bits of a variant identification code value included in the glyph variant information.

* * * * *